US012385602B2

(12) United States Patent
Nagata et al.

(10) Patent No.: US 12,385,602 B2
(45) Date of Patent: Aug. 12, 2025

(54) HYDROGEN POWER SYSTEM

(71) Applicant: TOYOTA JIDOSHA KABUSHIKI KAISHA, Toyota (JP)

(72) Inventors: Hiroya Nagata, Toyota (JP); Yoshifumi Kawakami, Toyota (JP); Ryosuke Yamamoto, Aichi-ken (JP); Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 18/416,947

(22) Filed: Jan. 19, 2024

(65) Prior Publication Data

US 2024/0344662 A1 Oct. 17, 2024

(30) Foreign Application Priority Data

Apr. 17, 2023 (JP) ................................ 2023-067143

(51) Int. Cl.
*F17C 5/02* (2006.01)

(52) U.S. Cl.
CPC .......... *F17C 5/02* (2013.01); *F17C 2221/012* (2013.01); *F17C 2223/0123* (2013.01); *F17C 2250/0434* (2013.01)

(58) Field of Classification Search
CPC ........ F17C 2223/0123; F17C 2221/012; F17C 5/02
See application file for complete search history.

(56) References Cited

U.S. PATENT DOCUMENTS 12,055,092 B1 * 8/2024 Yamamoto .......... F02D 41/0027
2008/0009987 A1 1/2008 Williams et al.
2014/0322623 A1 * 10/2014 Ohgami ............ H01M 8/04753 429/427
2021/0207552 A1 7/2021 Nakano et al.

FOREIGN PATENT DOCUMENTS

JP 2008-031989 A 2/2008
JP 2020-045832 A 3/2020

* cited by examiner

*Primary Examiner* — Kevin A Lathers
(74) *Attorney, Agent, or Firm* — SoraIP, Inc.

(57) ABSTRACT

A hydrogen power system includes a hydrogen engine that operates using hydrogen as an energy source, a hydrogen tank that stores liquid hydrogen, and a hydrogen pump that pumps up the liquid hydrogen from the hydrogen tank and outputs it to the hydrogen engine, A hydrogen pump, a part of which slides within the hydrogen tank, and a controller, and the controller stops driving the hydrogen pump when it is determined that the efficiency of the hydrogen pump is decreasing, and then, after a prescribed wait time has elapsed, the hydrogen pump is driven again.

5 Claims, 5 Drawing Sheets

HYDROGEN POWER SYSTEM

CROSS-REFERENCE TO RELATED APPLICATION

This application claims priority to Japanese Patent Application No. 2023-067143 filed on Apr. 17, 2023, incorporated herein by reference in its entirety.

BACKGROUND

1. Technical Field

This specification discloses a hydrogen power system that includes a power device configured to operate using hydrogen as an energy source and a hydrogen tank configured to store liquid hydrogen.

2. Description of Related Art

In recent years, hydrogen power systems have been known that include a power device that operates using hydrogen as an energy source and a hydrogen storage structure. For example, fuel cell electric vehicles are equipped with a hydrogen power system including: a fuel cell that generates power using hydrogen; a motor that operates on the power generated by the fuel cell; and a hydrogen tank. Hydrogen engine vehicles are equipped with a hydrogen power system that includes a hydrogen engine that operates on hydrogen and a hydrogen tank.

Some of such hydrogen power systems store hydrogen in a liquid state in order to improve hydrogen storage efficiency. In this case, the hydrogen power system includes a hydrogen tank that stores liquid hydrogen and a hydrogen pump that pumps up the liquid hydrogen. A hydrogen pump typically includes a sliding member that slides inside a hydrogen tank. This sliding member is cooled by liquid hydrogen while the hydrogen pump sucks and discharges the liquid hydrogen.

SUMMARY

If the efficiency of the hydrogen pump decreases for some reason, the sliding member of the hydrogen pump may not be sufficiently cooled, and the temperature of the sliding member may rise. If the hydrogen pump continues to be driven in this state, the friction of the sliding member will increase, which may lead to degradation of the sliding member and also the hydrogen pump.

Japanese Unexamined Patent Application Publication No. 2008-031989 (JP 2008-031989 A) discloses a technique for limiting the speed of a vehicle or warning a user when an abnormality is detected in a fuel pump mounted on the vehicle. However, the technique disclosed in JP 2008-031989 A cannot prevent such degradation of the hydrogen pump.

The present specification therefore discloses a hydrogen power system that can effectively reduce or prevent degradation of a hydrogen pump.

A hydrogen power system disclosed in this specification includes:

a power device configured to operate using hydrogen as an energy source;

a hydrogen tank configured to store liquid hydrogen;

a hydrogen pump configured to pump up the liquid hydrogen from the hydrogen tank and output the liquid hydrogen toward the power device, and configured in such a manner that part of elements slide inside the hydrogen tank; and a controller.

The controller is configured to, when the controller determines that efficiency of the hydrogen pump has decreased, stop driving the hydrogen pump, and then drive the hydrogen pump again after a prescribed wait time has elapsed.

With this configuration, the hydrogen pump is cooled by the liquid hydrogen during the period in which the hydrogen pump is temporarily stopped. This reduces or prevents seizure of a sliding member and effectively reduces or prevents degradation of the hydrogen pump.

In this case, the hydrogen pump may be a piston pump including a cylinder and a piston, the cylinder including a pump chamber where the liquid hydrogen flows in and out, and the piston being configured to expand and contract the pump chamber by sliding back and forth inside the cylinder.

With this configuration, the piston that is the sliding member and the cylinder can reliably contact the liquid hydrogen, and the piston and the cylinder are cooled by the liquid hydrogen.

The hydrogen power system may further include:

a vaporizer configured to vaporize the pumped liquid hydrogen to convert the liquid hydrogen to hydrogen gas; and an intermediate chamber configured to temporarily store the hydrogen gas output from the vaporizer.

Since the intermediate chamber is provided, hydrogen can continue to be supplied to the power device even when the hydrogen pump is temporarily stopped. As a result, degradation of the hydrogen pump can be effectively reduced or prevented while reducing a decrease in efficiency of the hydrogen power system itself.

The controller may be configured to determine that the efficiency of the hydrogen pump has decreased when a prescribed decreased state continues for a prescribed first determination time.

The decreased state may be a state where either or both of a first condition and a second condition are satisfied.

The first condition may be that a drive amount of the hydrogen pump is equal to or larger than a prescribed reference drive amount.

The second condition may be that a temperature of the liquid hydrogen output from the hydrogen pump is equal to or higher than a prescribed reference temperature, or that a pressure of the liquid hydrogen output from the hydrogen pump is less than a reference pressure.

With this configuration, it is possible to reliably detect a decrease in efficiency of the hydrogen pump.

In this case, the controller may be configured to when determination is made that the decreased state is present, increase output limitation on the power device compared to before the determination, and after driving the hydrogen pump again, gradually reducing the output limitation on the power device according to an efficiency state of the hydrogen pump.

With this configuration, the load on the hydrogen pump can be reduced according to the situation, and degradation of the hydrogen pump can be more effectively reduced or prevented.

According to the technique disclosed in this specification, when it is determined that the efficiency of the hydrogen pump has decreased, the hydrogen pump is temporarily stopped. During this stop period, the hydrogen pump is cooled by the liquid hydrogen, so that degradation of the hydrogen pump can be efficiently reduced or prevented.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
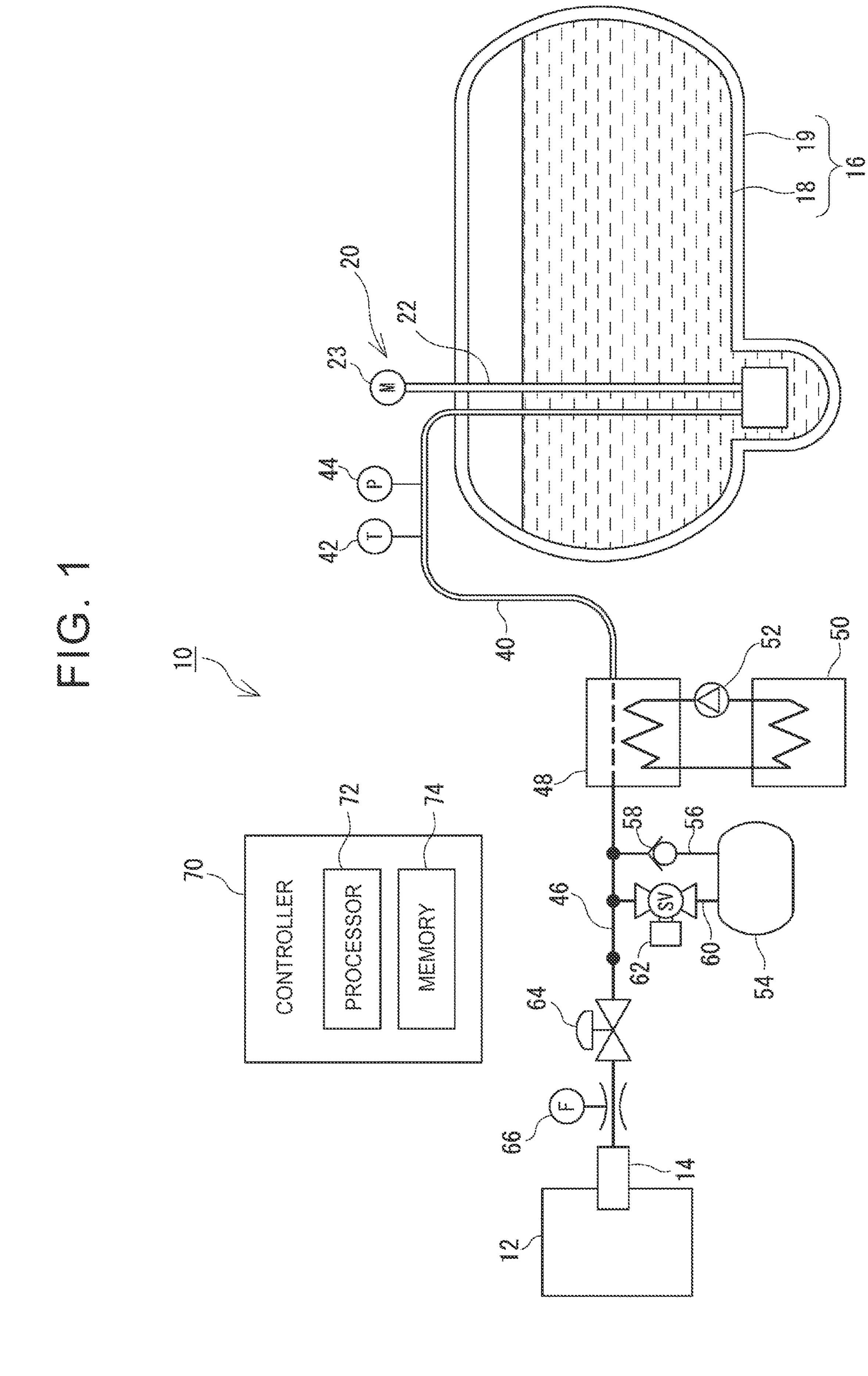
FIG. 1 is a schematic diagram showing the configuration of a hydrogen power system.

The configuration of the hydrogen power system 10 will be described below with reference to the drawings. FIG. 1 is a schematic diagram showing the configuration of a hydrogen power system 10. This hydrogen power system 10 stores hydrogen in a liquid state, converts hydrogen into a gas state, and supplies the hydrogen to a power device. In this example, the power device is a hydrogen engine 12. This hydrogen power system 10 is mounted on a vehicle. The configuration of the hydrogen engine 12 is not particularly limited. In the following, the hydrogen engine 12 is a direct injection type hydrogen engine that directly injects hydrogen gas into the engine cylinder.

The hydrogen power system 10 has a hydrogen tank 16 that stores liquid hydrogen. The hydrogen tank 16 stores liquid hydrogen insulated. As such hydrogen tank 16, for example, a double-structured container can be used. In this case, the hydrogen tank 16 has an inner tank 18 and an outer tank 19 that covers the inner tank 18, and a vacuum insulation layer is formed between the inner tank 18 and the outer tank 19.

In the hydrogen tank 16, liquid hydrogen is kept at an extremely low temperature (e.g., below −253° C.). Further, the pressure of liquid hydrogen in the hydrogen tank 16 is approximately the same as atmospheric pressure or slightly higher than atmospheric pressure, for example, 1 MPa or less.

The hydrogen tank 16 is provided with a hydrogen pump 20 that pumps up stored liquid hydrogen and sends it to the hydrogen engine 12. This hydrogen pump 20 is a booster pump that discharges liquid hydrogen while pressurizing it. More specifically, the hydrogen pump 20 is a piston pump that includes a cylinder 22 and a piston 28 (not shown in FIG. 1, see FIG. 2). The end of the hydrogen pump 20 is placed within the hydrogen tank 16.

Figure 2:
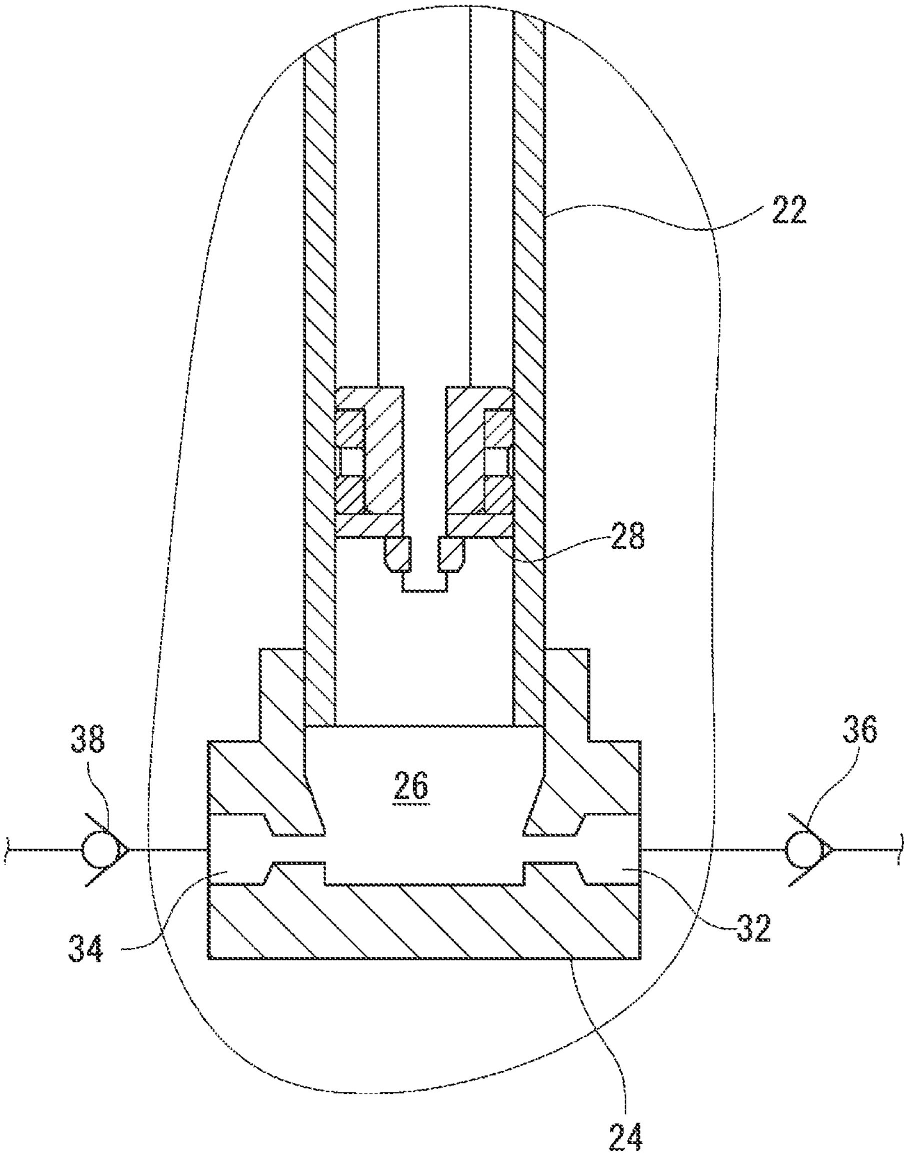
FIG. 2 is a cross-sectional view showing the configuration of the end of the hydrogen pump.

FIG. 2 is a schematic cross-sectional view of the end of the hydrogen pump 20. As shown in FIG. 2, a pump chamber 26 is formed at the end of the hydrogen pump 20 by a cylinder 22 and a cylinder head 24. The piston 28 expands and contracts the pump chamber 26 by moving back and forth inside the cylinder 22. The piston 28 moves back and forth by power output from the pump motor 23 (see FIG. 1). Note that, as a matter of course, the circumferential surface of the piston 28 is in close contact with the inner circumferential surface of the cylinder 22, and the piston 28 slides within the cylinder 22.

As the pump chamber 26 expands, liquid hydrogen in the hydrogen tank 16 is sucked into the pump chamber 26 via the suction port 32. Furthermore, as the pump chamber 26 is reduced in size, the liquid hydrogen in the pump chamber 26 is pressurized and then is forced into the liquid flow path 40 through the discharge port 34. In order to enable such suction and discharge of liquid hydrogen, check valves 36 and 38 are provided at the suction port 32 and the discharge port 34. In this manner, by providing the hydrogen pump 20 with a pressure increasing function, the pressure resistance required for the hydrogen tank 16 can be lowered.

That is, as described above, in this example, the hydrogen engine 12 is a direct injection type that injects hydrogen gas directly into the engine cylinder. The directly injected hydrogen gas is required to be at a very high pressure (for example, from 5 MPa to several tens of Mp) compared to atmospheric pressure. In order to obtain such high-pressure hydrogen gas, it is required that the pressure be sufficiently high before it is vaporized, that is, in a liquid state. Therefore, it is also possible to store liquid hydrogen at high pressure (for example, several tens of Mp) in the hydrogen tank 16. However, in this case, the pressure resistance of the hydrogen tank 16 must be increased, leading to an increase in the cost and weight of the hydrogen tank 16.

On the other hand, in this example, the pressure of the liquid hydrogen in the hydrogen tank 16 is set to approximately the same pressure or slightly higher than atmospheric pressure, and when the liquid hydrogen is vaporized, the hydrogen pump 20 is used to sufficiently increase the pressure of only the necessary amount. Then I take it out. With this configuration, hydrogen gas at a sufficiently high pressure can be obtained while keeping the pressure resistance of the hydrogen tank 16 low. In addition, by lowering the required pressure resistance, the cost required for the hydrogen tank 16 can be reduced. Furthermore, by lowering the required pressure resistance, the weight of the hydrogen tank 16 can be reduced. Furthermore, by lowering the required pressure resistance, it is possible to adopt a shape other than a spherical shape or a barrel shape as the shape of the hydrogen tank 16, and the degree of freedom in the shape of the hydrogen tank 16 is improved.

This will be explained with reference to FIG. 1 again. The pressure sensor 44 and the temperature sensor 42 detect the pressure and temperature of liquid hydrogen discharged from the hydrogen pump 20. Hereinafter, the pressure detected by the pressure sensor 44 will be referred to as "discharge hydrogen pressure PH", and the temperature detected by the temperature sensor 42 will be referred to as "discharge hydrogen temperature TH". When the efficiency of the hydrogen pump 20 decreases, the discharge hydrogen pressure PH tends to decrease, and the discharge hydrogen temperature TH tends to increase.

Liquid hydrogen discharged from the hydrogen pump 20 is supplied to the hydrogen engine 12 through a liquid flow path 40 and a gas flow path 46. The liquid flow path 40 is a flow path that guides liquid hydrogen discharged from the hydrogen pump 20 to the vaporizer 48. The vaporizer 48 is a heat exchanger that converts liquid hydrogen into hydrogen gas by exchanging heat between the liquid hydrogen and a refrigerant. Hydrogen gas generated in the vaporizer 48 is output to the gas flow path 46.

The vaporizer 48 exchanges heat between liquid hydrogen and a refrigerant, and vaporizes the liquid hydrogen. Refrigerant pump 52 circulates refrigerant between vaporizer 48 and heat source 50. Note that the refrigerant is not particularly limited, and may be a gas such as helium or a liquid such as water.

The gas flow path 46 is a flow path that guides hydrogen gas from the vaporizer 48 to the injector 14. An intermediate chamber 54 is connected to the gas flow path 46 via an inflow channel 56 and an outflow channel 60. The intermediate chamber 54 is a container that is disposed between the hydrogen tank 16 and the hydrogen engine 12 and temporarily stores hydrogen gas. By storing a certain amount of hydrogen gas in the intermediate chamber 54, even if pumping of liquid hydrogen by the hydrogen pump 20 is temporarily suppressed or interrupted, hydrogen gas can be stably supplied to the hydrogen engine 12. can continue to be supplied.

The inflow channel 56 is provided with a check valve 58 that prohibits flow from the intermediate chamber 54 toward the gas flow path 46. Further, the outflow channel 60 is provided with a shut valve 62. In principle, the shut valve 62 is opened while the hydrogen engine 12 is being driven. Further, the inflow channel 56 is located upstream of the outflow channel 60. Therefore, when the pressure in the gas flow path 46 is higher than the internal pressure in the intermediate chamber 54, the check valve 58 is opened and hydrogen gas flows into the intermediate chamber 54. On the other hand, when the internal pressure of the intermediate chamber 54 is higher than the pressure of the gas flow path 46, the hydrogen gas stored in the intermediate chamber 54 is supplied to the gas flow path 46 through the outflow channel 60.

A supply pressure reducing valve 64 is provided downstream of the outflow channel 60. The supply pressure reducing valve 64 reduces the pressure of hydrogen gas to a pressure suitable for the hydrogen engine 12. The reduced pressure hydrogen gas is supplied to the hydrogen engine 12 via the injector 14. The flow rate of hydrogen gas supplied to the hydrogen engine 12 is detected by a flow meter 66.

Controller 70 controls the operation of hydrogen power system 10. Controller 70 is physically a computer that includes a processor 72 and memory 74. The term "computer" also includes microcontrollers that incorporate a computer system into a single integrated circuit. Further, the controller 70 is not limited to one computer, but may be configured by combining a plurality of physically separated computers. The controller 70 controls the driving of a plurality of valves and pumps provided in the hydrogen power system 10 based on values detected by various sensors.

Specifically, the controller 70 controls the flow rate of hydrogen gas supplied to the hydrogen engine 12 in response to a request from an engine control unit (not shown). Further, the controller 70 executes fail-safe processing for the hydrogen pump 20. The fail-safe processing of this hydrogen pump 20 will be explained in detail below.

As described above, some elements (specifically, the piston 28) of the hydrogen pump 20 slide as it is driven. The piston 28 and cylinder 22 involved in the sliding movement are normally cooled by liquid hydrogen flowing into the pump chamber 26. However, if the efficiency of the hydrogen pump 20 decreases for some reason, the piston 28 and cylinder 22 will not be sufficiently cooled by liquid hydrogen. As a result, the clearance between the piston 28 and the cylinder 22 may become smaller, and the temperatures of both may rise. If the hydrogen pump 20 continues to be driven in this state, the temperatures of the piston 28 and cylinder 22 will further rise, and in some cases, the piston 28 will seize up on the cylinder 22, causing degradation or damage to the hydrogen pump 20.

Figure 3:
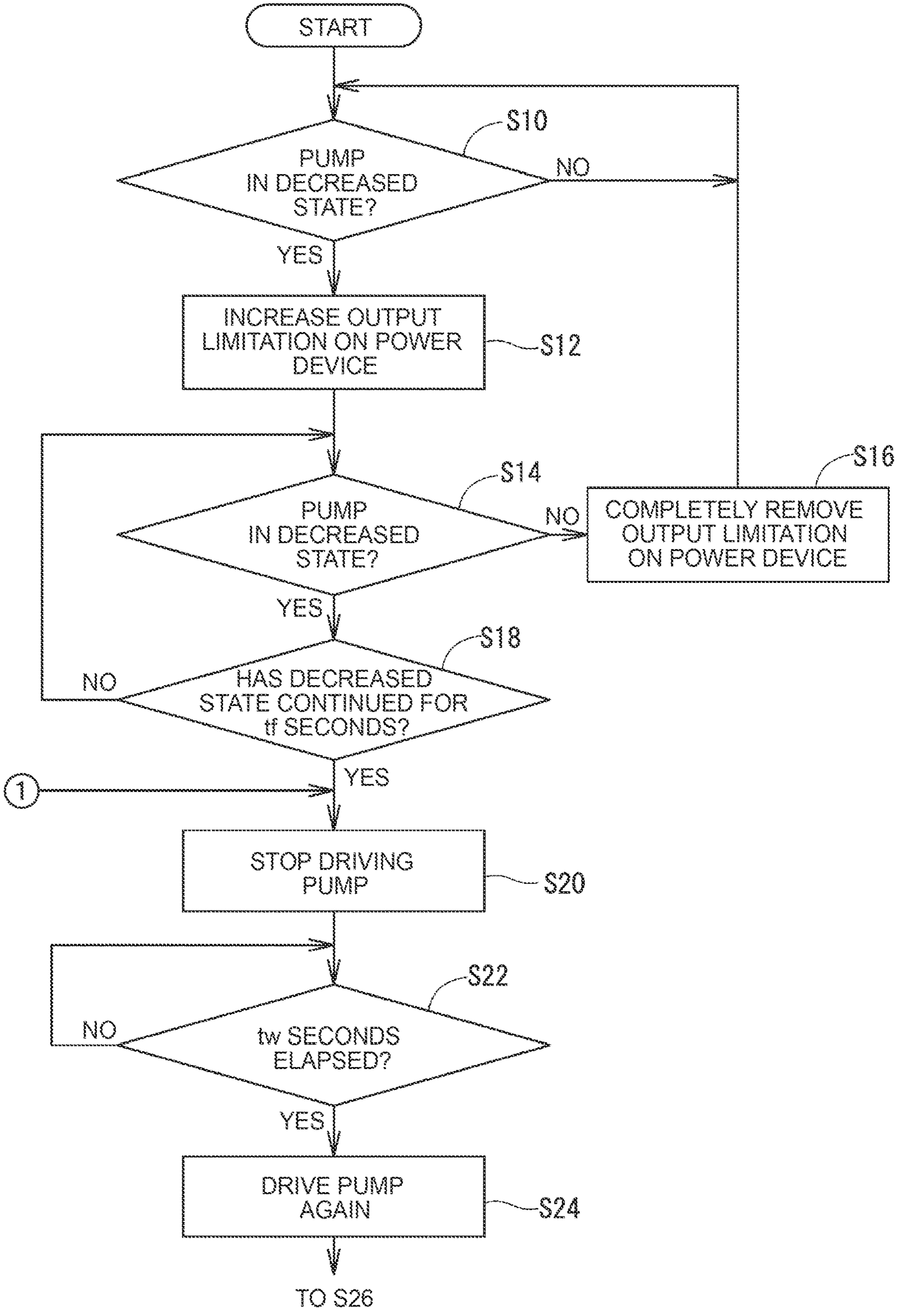
FIG. 3 is a flowchart showing the first half of the hydrogen pump fail-safe process.
Figure 4:
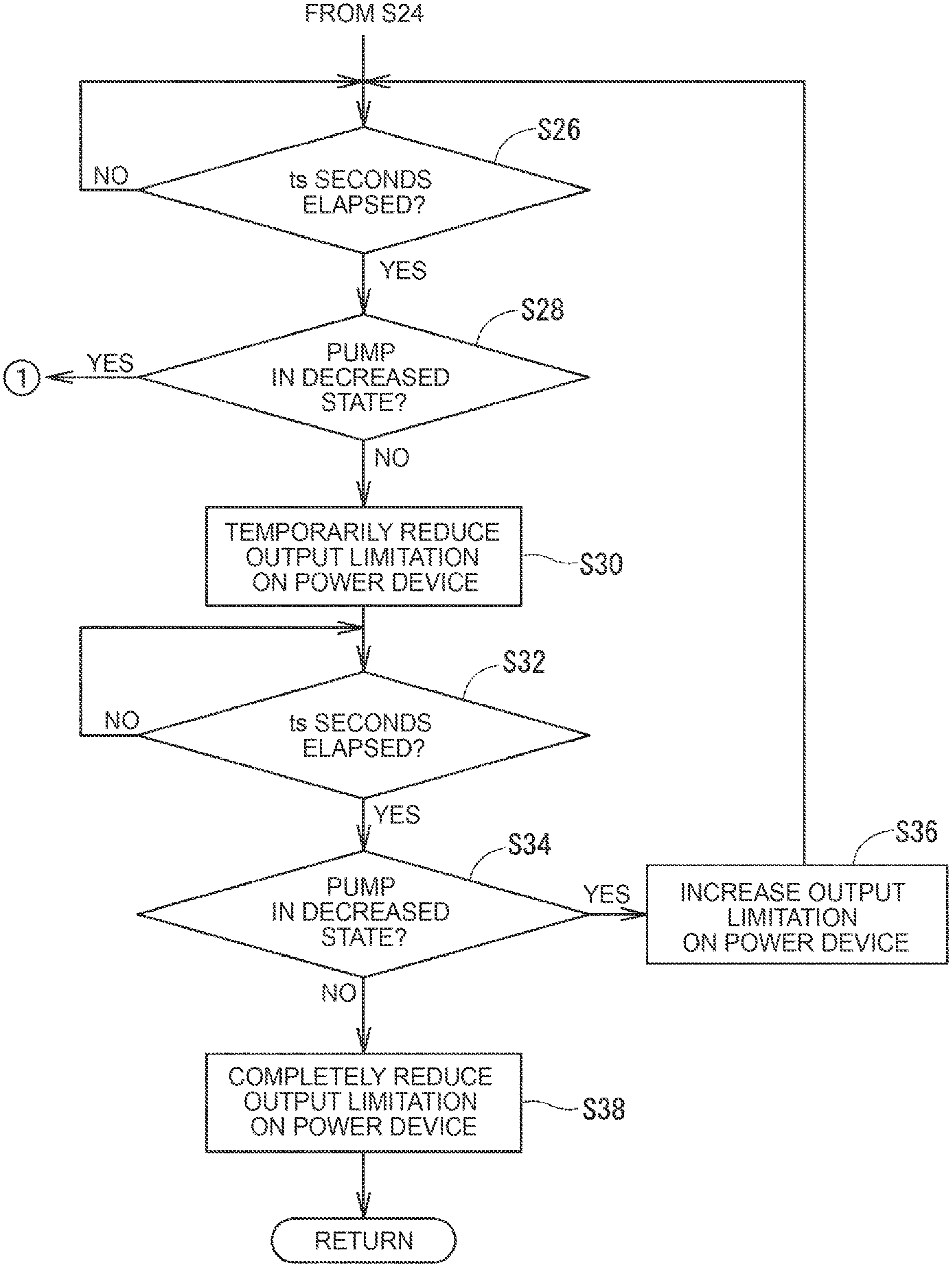
FIG. 4 is a flowchart showing the second half of the hydrogen pump fail-safe process.

In order to suppress such degradation of the hydrogen pump 20, the controller 70 monitors the state of the hydrogen pump 20, and executes fail-safe processing to temporarily stop driving the hydrogen pump 20, if necessary. FIGS. 3 and 4 are flowchart showing the flow of failsafe processing. This failsafe process is repeatedly executed while the hydrogen engine 12 is being driven.

In the fail-safe process, the controller 70 monitors whether the hydrogen pump 20 is in a prescribed decreased state. Here, the "decreased state" is a state that satisfies both the first condition and the second condition described below. The first condition is that the drive amount of the hydrogen pump 20 (hereinafter referred to as "pump drive amount DA") is equal to or greater than a prescribed reference drive amount DAst. As a parameter representing the pump drive amount DA, for example, the most recent power consumption of the hydrogen pump 20 or the most recent number of discharges of the hydrogen pump 20 can be adopted. Note that the reference drive amount DAst may be a fixed value that does not change regardless of the situation, or may be a variable value that changes depending on the situation. For example, the reference drive amount DAst may be a variable value that changes depending on the target discharge flow rate of the hydrogen pump 20.

The second condition is that the discharge hydrogen temperature TH is equal to or higher than the prescribed reference temperature THst, or that the discharge hydrogen pressure PH is lower than the prescribed reference pressure PHst. Here, the reference temperature THst and the reference pressure PHst may also be fixed values that do not change regardless of the situation, or may be variable values that change depending on the situation.

Figure 5:
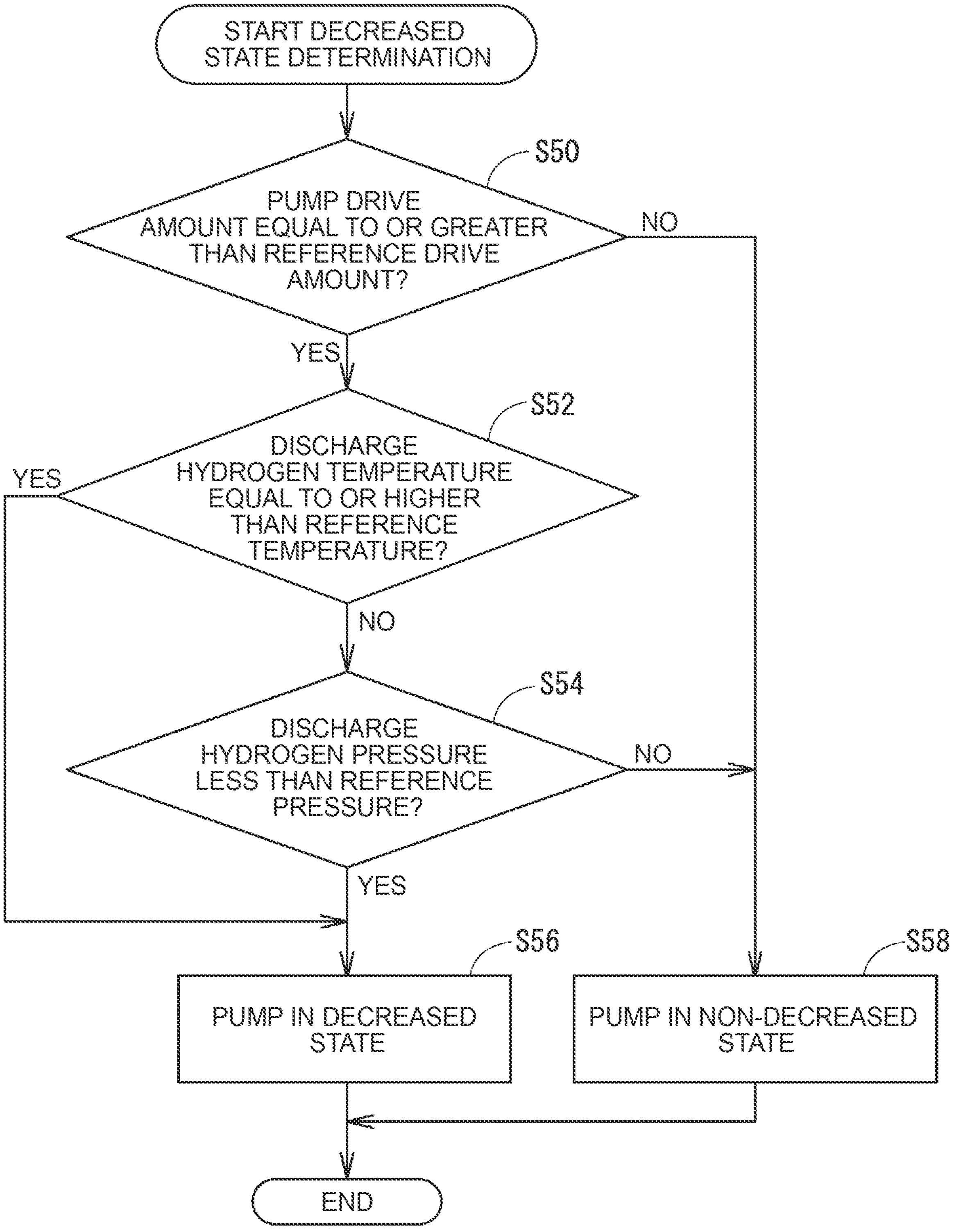
FIG. 5 is a flowchart showing the flow of processing for determining whether there is a decrease in efficiency.

If both the first condition and the second condition are satisfied, the controller 70 determines that the hydrogen pump 20 is in a decreased state. FIG. 5 is a flowchart showing the flow of determining whether the hydrogen pump 20 is in the decreased state. As shown in FIG. 5, the controller 70 compares the pump drive amount DA and the reference drive amount DAst (S50), and if DA<DAst (No in S50), determines that the pump drive amount DA is not in a decreased state (S58). On the other hand, if DA≥DAst (Yes in S50), the controller 70 compares the discharge hydrogen temperature TH and the reference temperature THst (S52). As a result of the comparison, if TH≥THst (Yes in S52), the controller 70 determines that the hydrogen pump 20 is in the decreased state (S56). On the other hand, if TH<THst (No in S52), the controller 70 compares the discharge hydrogen pressure PH and the reference pressure PHst (S54). As a result of the comparison, if PH≥PHst (No in S54), the controller 70 determines that the hydrogen pump 20 is not in the decreased state (S58). On the other hand, if PH<PHst (Yes in S54), the controller 70 determines that the hydrogen pump 20 is in the decreased state (S56).

The explanation will be given again with reference to FIG. 3. When the hydrogen pump 20 is not in the decreased state (No in S10), the controller 70 continues to monitor the state of the hydrogen pump 20. On the other hand, when the hydrogen pump 20 is in the decreased state (Yes in S10), the controller 70 increases the output limitation on the hydrogen engine 12 (S12). That is, normally, an upper limit value, that is, an output limit value is set for the output value of the hydrogen engine 12. An engine controller (not shown) controls the drive of the hydrogen engine 12 so that the output from the hydrogen engine 12 does not exceed this output limit value. Usually, a predetermined standard limit value LMst is set as this output limit value.

When the hydrogen pump 20 is in the decreased state, the controller 70 sets the output limit value of the hydrogen engine 12 to the regulation limit value LMa, which is lower than the standard limit value LMst. When the output limit value of the hydrogen engine 12 is lowered, the demand for pumping up liquid hydrogen is also reduced accordingly, so that the load on the hydrogen engine 12 is reduced.

The controller 70 continues to monitor whether the hydrogen pump 20 is in the decreased state while the load on the hydrogen engine 12 is reduced (S14). During the monitoring process, when the hydrogen engine 12 is no longer in the decreased state (No in S14), the controller 70 completely reduces the output limitation on the hydrogen engine 12 (S16). That is, the controller 70 changes the output limit value of the hydrogen engine 12 from the regulation limit value LMa to the standard limit value LMst, and then returns to S10.

On the other hand, when the hydrogen engine 12 remains in the decreased state (Yes in S14), the controller 70 compares the elapsed time since the hydrogen engine 12 went into the decreased state with a prescribed first determination time tf (S18). The first determination time tf is, for example, about 2 to 5 seconds, although it is not particularly limited. When the decreased state continues for the first determination time tf (Yes in S18), the controller 70 determines that the efficiency of the hydrogen pump 20 has decreased. In this case, the controller 70 stops driving the hydrogen pump 20 (S20). As a result, the sliding movement of the piston 28 of the hydrogen engine 12 is stopped. During this stop period, the piston 28 and cylinder 22 are cooled by the liquid hydrogen present around them. As a result, the clearance between the piston 28 and the cylinder 22 increases, and the efficiency of the hydrogen pump 20 is restored.

Note that when the hydrogen pump 20 stops driving, naturally the supply of hydrogen from the hydrogen tank 16 to the liquid flow path 40 is interrupted. However, in this example, since a certain amount of hydrogen gas is stored in the intermediate chamber 54, even if the hydrogen supply from the hydrogen tank 16 is temporarily interrupted, the hydrogen gas supply to the hydrogen engine 12 is continued. can. That is, in this example, while the hydrogen pump 20 is not being driven, the hydrogen engine 12 continues to be driven, although the output limitation is increased.

After the hydrogen pump 20 is stopped, the controller 70 restarts driving the hydrogen pump 20 (S24) when the prescribed wait time tw has elapsed (S22). Note that the wait time tw is not particularly limited, but for example, the wait time tw is a value larger than the first determination time tf, for example, from 5 seconds to 15 seconds. Further, the wait time tw may be a fixed value that is constant regardless of the situation, or may be a variable value that changes depending on the situation. For example, the wait time tw increases as the pump drive amount DA, detected immediately before stopping the hydrogen pump 20, or as the discharge hydrogen temperature TH increases, or as the discharge hydrogen pressure PH decreases. It may be a variable value.

When the hydrogen pump 20 is restarted, the controller 70 gradually reduces the output limitation on the hydrogen engine 12 (S26 to S38 in FIG. 4). Specifically, the controller 70 detects the state of the hydrogen pump 20 when the prescribed second determination time ts has elapsed (Yes in S26) after the hydrogen pump 20 resumes driving. If the hydrogen pump 20 is in the decreased state at this timing (Yes in S28), the process returns to S20 (see FIG. 3) and the hydrogen pump 20 is stopped again. Note that the second determination time ts is not particularly limited, and is, for example, from 2 seconds to 7 seconds.

On the other hand, in S28, when the hydrogen pump 20 is not in the decreased state (No in S28), the controller 70 temporarily reduces the output limitation on the hydrogen engine 12 (S30). In the case of provisional relaxation, the controller 70 sets the output limit value to an intermediate limit value LMb, which is smaller than the standard limit value LMst and larger than the regulation limit value LMa.

Further, the controller 70 continues driving the hydrogen pump 20 for the second determination time ts with the output limitation temporarily reduced (S32). Then, at the timing when the second determination time ts has elapsed (Yes in S32), the controller 70 determines the state of the hydrogen pump 20 again (S34). As a result of the determination, when the hydrogen pump 20 is in the decreased state (Yes in S34), the controller 70 increases the output limitation on the hydrogen engine 12 (S36), and then returns to S26. On the other hand, when the controller 70 determines in S34 that the hydrogen engine 12 is not in the decreased state (No in S34), it completely reduces the output limitation on the hydrogen engine 12 (S38). That is, the output limit value of the hydrogen engine 12 is changed from the intermediate limit value LMb to the standard limit value LMst. Thereafter, the controller 70 repeats the processes from S10 to S38 until an instruction is given to stop the operation of the hydrogen power system 10.

As is clear from the above explanation, in this example, when the efficiency of the hydrogen engine 12 has decreased, the driving of the hydrogen pump 20 is temporarily stopped. During this temporary stop period, the area around the sliding member of the hydrogen pump 20 is cooled by liquid hydrogen, making it easier to restore the efficiency of the hydrogen pump 20. As a result, degradation of the hydrogen pump 20 can be effectively reduced or prevented.

Further, in this example, since the intermediate chamber 54 for temporarily storing hydrogen gas is provided, even if the hydrogen engine 12 is temporarily stopped, the hydrogen engine 12 can be continuously driven. In other words, according to this example, degradation of the hydrogen pump 20 can be reduced or prevented while reducing a decrease in efficiency of the hydrogen power system 10.

Furthermore, in this example, the output limitation on the hydrogen engine 12 is changed depending on the state of the hydrogen pump 20. This reduces or eliminates the possibility of an excessive load being applied to the hydrogen pump 20, so that degradation of the hydrogen pump 20 can be more effectively reduced or prevented.

Note that the configurations described so far are only examples, and other configurations may be changed as appropriate as long as the configuration according to claim 1 is provided. For example, in the above description, the output limitation on the hydrogen engine 12 is changed depending on the state of the hydrogen pump 20. However, when the drive of the hydrogen pump 20 is temporarily stopped depending on the state of the hydrogen pump 20, the output limitation on the hydrogen engine 12 does not need to be changed. Further, the conditions for determining that the efficiency of the hydrogen pump 20 has decreased may also be changed as appropriate. For example, in the above description, when a state in which both the first condition and the second condition are satisfied continues for the wait time tw, the controller 70 determines that the efficiency of the hydrogen pump 20 has decreased, and the hydrogen pump 20 is temporarily stopped. However, if only one of the first condition and the second condition continues to be satisfied, it may be determined that the efficiency of the hydrogen pump 20 has decreased. Furthermore, it may be determined whether the efficiency of the hydrogen pump 20 has decreased based on another condition.

Furthermore, in the above description, the hydrogen engine 12 is illustrated as the power device. However, the power device may be any other device as long as it outputs power using hydrogen as an energy source. For example, the power device may be a device that includes a fuel cell that generates power using hydrogen and a motor that outputs motive power using the electric power generated by the fuel cell. Furthermore, in the above description, if the efficiency of the hydrogen pump 20 has decreased, the driving of the hydrogen pump 20 is stopped as many times as necessary. However, if the drive of the hydrogen pump 20 frequently stops, the operation of the hydrogen power system 10 itself may be stopped after giving a warning to the user.

What is claimed is:

1. A hydrogen power system, comprising:
- a power device configured to operate using hydrogen as an energy source;
- a hydrogen tank configured to store liquid hydrogen;
- a hydrogen pump configured to pump up the liquid hydrogen from the hydrogen tank and output the liquid hydrogen toward the power device, and configured in such a manner that part of elements slide inside the hydrogen tank; and
- a controller, wherein the controller is configured to, when the controller determines that efficiency of the hydrogen pump has decreased, stop driving the hydrogen pump, and then drive the hydrogen pump again after a prescribed wait time has elapsed.

2. The hydrogen power system according to claim 1, wherein the hydrogen pump is a piston pump including a cylinder and a piston, the cylinder including a pump chamber where the liquid hydrogen flows in and out, and the piston being configured to expand and contract the pump chamber by sliding back and forth inside the cylinder.

3. The hydrogen power system according to claim 1, further comprising:
- a vaporizer configured to vaporize the pumped liquid hydrogen to convert the liquid hydrogen to hydrogen gas; and
- an intermediate chamber configured to temporarily store the hydrogen gas output from the vaporizer.

4. The hydrogen power system according to claim 1, wherein:
- the controller is configured to determine that the efficiency of the hydrogen pump has decreased when a prescribed decreased state continues for a prescribed first determination time;
- the decreased state is a state where either or both of a first condition and a second condition are satisfied;
- the first condition is that a drive amount of the hydrogen pump is equal to or larger than a prescribed reference drive amount; and
- the second condition is that a temperature of the liquid hydrogen output from the hydrogen pump is equal to or higher than a prescribed reference temperature, or that a pressure of the liquid hydrogen output from the hydrogen pump is less than a reference pressure.

5. The hydrogen power system according to claim 4, wherein the controller is configured to
- when determination is made that the decreased state is present, increase output limitation on the power device compared to before the determination, and
- after driving the hydrogen pump again, gradually reducing the output limitation on the power device according to an efficiency state of the hydrogen pump.

* * * * *